United States Patent [19]

Schiel et al.

[11] Patent Number: 4,796,525
[45] Date of Patent: Jan. 10, 1989

[54] PRESS NIP FORMED BY A DEFLECTION-CONTROLLED ROLL IN CONJUNCTION WITH A TEMPERATURE-CONTROLLED ROLL

[75] Inventors: Christian Schiel; Albrecht Bauder, both of Heidenheim, Fed. Rep. of Germany

[73] Assignee: J. M. Voith GmbH, Fed. Rep. of Germany

[21] Appl. No.: 899,236

[22] Filed: Jul. 21, 1986

Related U.S. Application Data

[62] Division of Ser. No. 762,154, filed as PCT EP84/00376 on Nov. 29, 1984, published as WO85/02425 on Jun. 6, 1985, Pat. No. 4,639,990.

[30] Foreign Application Priority Data

Nov. 30, 1983 [DE] Fed. Rep. of Germany ....... 3343313

[51] Int. Cl.$^4$ .............................................. B30B 3/04
[52] U.S. Cl. ............................ 100/93 RP; 100/160; 100/162 B; 100/170; 100/176; 29/116.1; 29/116.2; 165/89; 34/124
[58] Field of Search ............... 29/161.1, 124, 130, 29/113 AD, 116.2; 100/155 R, 162 B, 93 RP, 170, 176, 160; 72/200; 165/89; 34/124

[56] References Cited

U.S. PATENT DOCUMENTS

| | | | |
|---|---|---|---|
| Re. 32,586 | 2/1988 | Schiel et al. | 100/162 B |
| 3,182,587 | 5/1965 | Woodhall | 100/93 RP |
| 3,362,055 | 1/1968 | Bryce | 29/113 AD |
| 3,643,344 | 4/1972 | Strube | 34/124 |
| 4,282,638 | 8/1981 | Christ et al. | 100/93 RP X |
| 4,414,889 | 11/1983 | Guttinger | 100/162 B |
| 4,506,421 | 3/1985 | Appenzeller et al. | 29/113 AD |
| 4,639,990 | 2/1987 | Schiel et al. | 29/116 R |

FOREIGN PATENT DOCUMENTS 1254336 11/1967 Fed. Rep. of Germany .
2102913 2/1983 United Kingdom .

OTHER PUBLICATIONS

European Patent Application, 43119; 6–1982.

*Primary Examiner*—Andrew M. Falik
*Attorney, Agent, or Firm*—Ostrolenk, Faber, Gerb & Soffen

[57] ABSTRACT

A roll arrangement for calendars or super-calendars is provided by the combination of two rolls which together form a press nip wherein one of the rolls is solely deflection-controllable and the other roll is solely temperature-controllable zone by zone. The temperature-controllable roll has a tubular rotatable roll shell and a stationary core extending through the roll shell. The space between the roll shell and the core is divided by means of several peripheral seals into numerous annular chambers. A flow of fluid is guided through each of the annular chambers. The fluid temperature in each annular chamber is independently controllable. Consequently the temperature-controlled roll shell can be heated by the fluid to different degrees along the axis thereof to control its external diameter along each zone. The peripheral seals are sized to have free play in a direction transverse to the roll axis and are constructed as endless, metallic rings. The external diameter of the rings is a trifle smaller than the internal diameter of the roll shell.

18 Claims, 4 Drawing Sheets

PRESS NIP FORMED BY A DEFLECTION-CONTROLLED ROLL IN CONJUNCTION WITH A TEMPERATURE-CONTROLLED ROLL

This is a division of application Ser. No. 762,154, filed as PCT EP84/00376 on Nov. 29, 1984, published as WO85/02425 on Jun. 6, 1985, now U.S. Pat. No. 4,639,990.

TECHNICAL FIELD

The invention relates to paper presses and more particularly to a web processing roll for the paper fabrication industry. In rolls of this type a roll shell is divided along its length or in other words along the roll axis into several zones. For operational considerations, it is required to control the temperature in each zone of the roll shell independently of the temperature in the other zones. This can produce a temperature profile over the length of the roll shell which is either very constant are or one in which the temperatures are deliberately different to produce a desired temperature profile.

PRIOR ART

Fig. 2 of German DE-AS No. 12 54 336 show a stationary core supported via several annular partitions and, bearing annular seals located, on the inside of the roll shell. This suggested construction is not, in applicant's opinion, implementable because due to the weight of the core, high frictional forces occur at the places where the partitions touch the roll shell during the rotation of the roll shell. Accordingly, the surfaces which slide on one another will wear out and locally occuring frictional heat will create zones with higher temperatures, which is undesirable. This effect is further aggravated if the roll shell experiences deflection, e.g. under its own weight or when loaded by a counter roll.

Other known roll designs avoid foregoing disadvantages by a core for supplying the heating medium which is rotating with the roll shell. Then, however, a complicated rotary head is required to couple the heating medium to the core (see FIG. 1 of German DE-AS No. 12 54 336).

From FIG. 9 of German DE-OS No. 31 28 722 illustrates another roll with a shell provided with zone controllable temperatures. The stationary core of this roll is only supported at both its ends (in support stands not shown). The bearings for the roll shell are disposed on the core. With the corporation of a counter roll, a press nip is provided (see FIGS. 2 and 8), through which a web of paper, moves in order to smooth it. The axes of the two rolls and the press nip lie in a so-called press plane. This roll is known as a so-called deflection-controllable roll, in which the stationary core is constructed as a heavy, massive deflecting support. On both sides of the press plane it bears a longitudinal seal which divides the annular space (between the core and the roll shell) into two semi-circular chambers. According to FIG. 9 of the above document, the semi-circular chamber associated with the counter roll is divided by means of several peripheral seals into several semi-circular chamber sections lying one behind the other in the direction of the roll axis. These chamber sections are acted upon by varying fluid pressures in order to achieve a specific deflection of the roll shell. The fluid pressures are used to control the loading pressure profile in the press nip (along the length of the roll shell. For treating a web of paper the web should be subjected to a specific caliber pressure cross directional profile, usually as uniform as possible.

According to FIG. 7 the other semi-circular chamber can also be divided into several chambers in a similar manner. In all known embodiments the peripheral seals have to be formed from circular segments. i.e. each peripheral seal can only extend from one longitudinal seal to the other or only around half the periphery of the roll. The peripheral seals are displaceable relative to the core perpendicular to the roll axis so that the deflection of the core and the deflection of the roll shell can differ from one another.

The fluid supplied to the individual chamber sections can be heated or cooled to different degrees. The intent is to impose different temperatures upon the roll shell in the various zones so as to change the external diameter of the roll shell in each zone by small amounts, in magnitudes of 1/1000 to 1/100 mm). This method is an attempt to control the profile of the loading pressure in the press nip along the length of the roll shell and consequently the caliber cross directional profile of the paper web even more sensitively than is possible merely by controlling the deflection of the roll shell.

The peripheral seals of the known roll is formed with the annular segments pressed onto the internal surface of the roll shell by means of pressure springs. Frictional forces are still present. Although these forces are smaller than those found in the roll according to German DE-AS No. 12 54 336, still the wear and inability to obtain a desired temperature profile over the length of the roll are present.

SUMMARY OF THE INVENTION

It is an object of the present invention to provide a roll the shell of which rotates around a stationary core and in which adjustable different zone temperatures are provided. Frictional forces and wear caused by the relative movement between the roll shell and the peripheral seals are eliminated as far as possible when the roll shell rotates. At the same time the development of frictional heat in particular is avoided as it could distort the desired temperature profile on the external surface of the roll shell.

The present invention is an improvement to the press design shown in FIG. 9 of German DE-OS No. 31 28 722. In accordance with the present invention, a stationary core is provided which is only supported at both its ends and which is deliberately not supported on the peripheral seals located between the roll shell and the core. In contrast to previous arrangements, the peripheral seals are displaceable relative to the core perpendicularly to the roll axis. These features ensure that the core can deflect under its own weight, independently of the roll shell. The supporting forces from the core are not transmitted via the peripheral seals to the roll shell and vice versa. Identically, the roll shell can also deflect under its own weight or under loading from a counter roll independently of the core. The net result is that since the peripheral seals do not transfer any supporting forces, no frictional forces occur as a result.

In addition, the present invention eliminates almost completely eliminate other sources of friction and wear on the peripheral seals. This is achieved primarily in that one avoids the separation of the annular chambers by means of the two unequally pressurized longitudinal seals into two semi-circular sub-chambers is avoided. In other words, in each annular chamber roll a substantially uniform pressure, prevails which is equal to or approximately equal to atmospheric pressure. Furthermore as the fluid is supplied to all annular chambers uniformly without excess pressure, there are also no pressure differences in pressure between the adjacent annular chambers. Consequently it is not necessary for two adjacent annular chambers to be completely sealed from each other. Moreover, a slight exchange of fluid between adjacent annular chambers is not detrimental.

Thus, the peripheral seals according to the invention are constructed as closed rings comprised of a stiff, preferably metallic, material. The external diameter of the rings is somewhat smaller than the internal diameter of the roll shell, so that the peripheral seals have full play along the interior of the roll shell. Therefore, direct contact between the peripheral seals and the interior of the roll shell is practically avoided. Thus, frictional heat at the peripheral seals which develops in prior art divids is now reduced to nearly zero in the roll of the invention.

Seal materials may include metals, such as brass or bronze, and also wear-resistant plastics which have properties similar to the a high rigidity and non-deformability of metals. The gap between the peripheral seal and the roll shell is approximately 1/10 to 2/10 mm (in the concentric position. When using a strongly heated heating fluid (of about 100° C.) the fact that the peripheral seals extend more strongly or at least faster than the roll shell has to be taken into consideration.

Because the pressure in each annular chamber is substantially uniform (approximately the same level as atmospheric pressure) the core may be formed of relatively thin-walled tubular material or (as explained further below) of annular body sections. A further advantage is that oil with a low viscosity may be used as heating or cooling fluid; frictional losses are reduced still further by this.

Of course the fact that the two longitudinal seals are dispensed with, results in that the roll, in contrast to the subject matter of German DE-OS No. 31 28 722, is not deflection-controllable but only zone by zone temperature-controllable. However in accordance with another aspect of the invention it is possible in a simpler manner to influence the pattern of the loading pressure in a press nip both by means of deflection control and also by means of zone by zone temperature control. This is made possible due to the fact that one of the two rolls which together form the press nip is sole deflection-controllable and the other roll is sole temperature-controllable zone by zone. This method is therefore simpler and also more effective because each of the two rolls can be controlled independently from one another. In contrast thereto, in accordance with German DE-OS No. 31 28 722 it is extremely difficult to set both a specific pressure and also a specific temperature in each of the different fluid flows. For a roll arrangement in accordance with the present invention, the roll of German DE-PS No. 30 24 575 (similar to U.S. Pat. No. 4,414,890) which illustrates a deflection-controllable roll is applicable.

As mentioned above, the invention avoids the frictional heat development on the roll shell at points thereof where the peripheral seals are located. This is an important consideration because the desired temperature profile on the surface of the roll shell can be adjusted very precisely. This is done by controlling the quantities of heat supplied to the various annular chambers via fluid flow in each chamber. As with the known rolls, control of heat can be achieved by temperature control or (deviating from this) by controlling the fluid flow.

The roll in accordance with the invention is suitable for calenders in paper machines and, also for so-called gloss calenders, or for paper calenders for so-called super calenders. In all applications it depends, as already mentioned above, on making the thickness of the continuous web of paper uniform over the web width or on maintaining an existing uniformity. This can be achieved with the roll according to the invention without any difficulties. It allows rather large diameter changes by temperature control in the individual zones. If necessary the changes in diameter can be up to 2/100 mm, with only a relatively slight change in the fluid temperature required, e.g. approximately 20° C.

A further advantage of the design according to the invention consists in that a pre-determined roll shell length can be divided into a large number of zones each of which is fairly narrow. Thus, it is possible to control the changes in diameter at closer points along the axis of the roll, to obtain a more defined pressure profile.

By adding a longitudinally extending seal in each chamber and optionally scraper bars a good uniform transfer of heat from the fluid to the roll shell (or vice versa) results. The two places of connection for supplying and returning fluid are preferably be disposed in direct proximity to both sides of the longitudinal seal. This forces the fluid to circulate along the entire periphery of the core in each zone. The fluid is either slightly pressurized, or the expedient of using the rotating roll shell to circulate the fluid is used. A feed pump will not be needed in this case. In certain circumstances it should be expected that the rotation of the roll shell in that half of the annular chambers in which the return lines are connected causes slight excess pressure, which may deform the roll shell. Therefore the longitudinal seal is preferably disposed in the press plane (or in its proximity) so that the direction of the deflection of the roll shell caused by the excess pressure runs at right angles to the press roll plane.

In order to improve the heat transfer from the fluid to the roll shell (or vice versa) even further, the fluid scraper bars are provided. They scrape off the film of fluid adhering to the roll shell which would otherwise tend to insulate the roll shell. It would also be possible to cause turbulence in the rotating fluid by other similar components. Turbulence alone however would be far less effective.

In accordance with a preferred scraper bar, longitudinal seal, and peripheral seals support embodiment the peripheral seals are supported by the longitudinal bars and also secured against rotation by than (i.e. against being entrained by the rotating roll shell). All bars and seals extend into grooves (longitudinal grooves or peripheral grooves) which are provided on the exterior surface of the core.

A different, simpler design of the longitudinal bars avoids the criss-cross by and of the longitudinal bars and the peripheral seals. Thus the peripheral seals can selectively be held by means of a safety device against torsion directly on the core or can be designed without such a safety device.

As already mentioned, the peripheral seals are constructed as closed rings. In order to be able to insert them nevertheless into the annular grooves provided on the core, two possibilities exist:

1. According to one embodiment each peripheral seals can be multi-sectional.

2. According to another embodiment, however, the core is multi-sectional so that simple single-piece rings can be used as peripheral seals. As compared to a single-piece core, a multisectional core made of several annular bodies involves only small expenditures upon usage of modern machine tools.

To control the heat supplied to each annular chamber, most simply a control valve is provided for each zone by which the fluid flow to each individual annular chamber is controlled. However, if it is necessary to set relatively high temperature differences between individual zones of the roll shell, then this can be achieved better by providing several differently heated fluid sources. By connecting a given chamber to one or the other of the fluids more accurate selectively temperature control is enabled. In other words: In comparison with other rolls, which can be either heated or cooled, the temperature range is doubled in accordance with the present invention.

In accordance with a further concept of the invention, a further additional effect can be achieved by a preferred method of construction of the present invention. This primarily allows the roll to operate with the same mean fluid temperature for all zones, at a so-called normal temperature. By this is understood that the temperature (of about 50° C.) which is achieved in continuous operation if the fluid is neither heated nor cooled. As long as the roll is operated in this way, it works in the same way as the known equitherm rolls. This does not allow the approaching web of paper traveling over the roll from transferring an irregular temperature distribution onto the roll shell if the web temperature is irregularly over its width. For example, the condition is avoided wherein a permanently above- average warm region (longitudinal strips) of the web of paper heats a specific zone of the roll shell above average, so that in this zone the external diameter of the roll shell is increased. If this were so, in this zone the web of paper would be more strongly pressed than outside this zone. The advantage of the operation with fluid which has normal temperature is that no energy is consumed for the cooling or heating of the fluid. However if necessary, each zone can be cooled or heated with the fluids as needed. To this end, a mixture of fluid with normal temperature and one of the tempered fluids can also occur. This is enabled by setting the respective control valve to an intermediate position, in which fluid from more than one source is supplied simultaneously.

In a given embodiment the stationary core is fixed at at least one end of a specially provided roll directly in the support stand for the roll shell. In this case the roll shell is positioned on the core and the connection head is fixed to the core.

In a particularly advantageous design of the control valves, their actuation devices are disposed clearly around the stationary connection head on its exterior. A similar arrangement of the control valves is known from U.S. Pat. No. 3,182,587 (FIG. 3 L and 4); however there the core and the connection head are fixed on the roll shell and rotate with this.

DETAILED DESCRIPTION OF THE INVENTION

Figure 1:
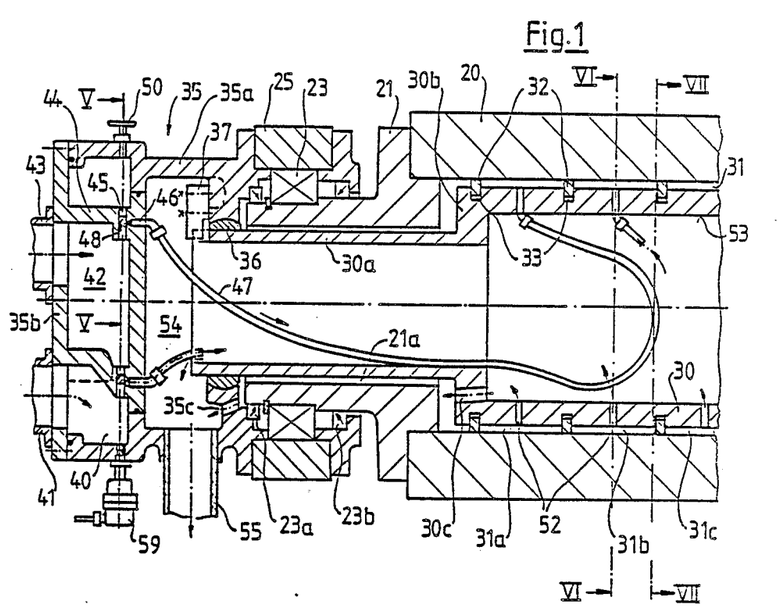
FIG. 1 is a longitudinal section through the operative end of a roll according to the invention.
Figure 2:
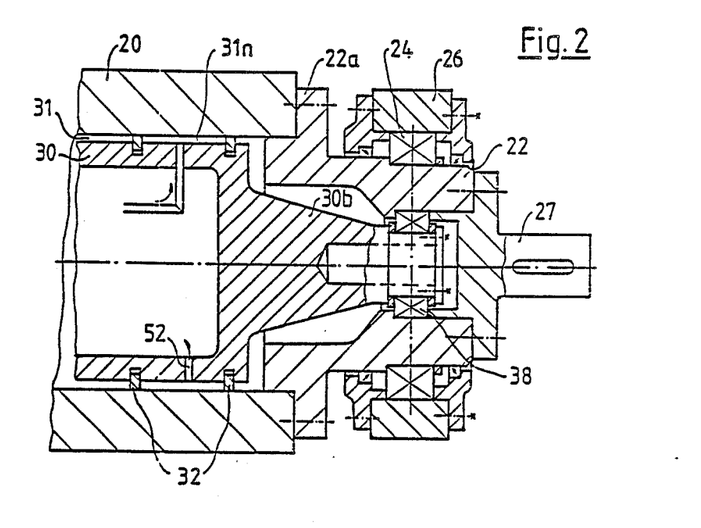
FIG. 2 is a longitudinal section through the drive end of the roll of FIG. 1.

The roll shown in FIGS. 1 and 2 has a tubular roll shell 20, on each end of which is fixed a bearing neck 21 and 22, respectively. The entire roll shell 20, 21, 22 is positioned by means of self-aligning roller bearings 23 and 24 in a support stand 25 and 26 respectively. Both bearings 23 and 24 are sealed on both sides. Bearing 23 on the operative side thereof is sealed by means of sealing rings 23a and 23b. The support stands 25 and 26 can rest in known manner on a rigid machine frame (not shown) or are fixed in moveable rocking levers (also not shown). At the drive side end a coaxial journal 27 is provided.

Through the interior of the roll shell 20, 21, 22 extends a stationary core 30, of a hollow body having fairly thin walls in relation to the walls of roll shell 20. Between core 30 and roll shell 20 remains an annular space 31. The space 31 is divided by a plurality of annular peripheral seals 32 into numerous annular chambers 31a, 31b... 31n, to which a flow of fluid (preferably oil) can be supplied independently from one another to heat or cool the roll shell 20 on a zone by zone basis. The peripheral seals 32, which are hereafter called "annular seals", all have the form of closed rings, i.e. endless rings. The annular seals 32 rest in annular grooves 33 which are provided in the core 30. The inner diameter of the annular seals 32 may be larger than the diameter of the bottom of the grooves 33 so that the seals are radially displaceable in the annular grooves 33.

On the operative side end of the roll (FIG. 1) on the exterior of the support stand 25 is fixed a connection head 35 which serves to distribute the heating and/or cooling fluid and is described in more detail below. The core 30 has a projecting extension tube 30a which extends into the connection head 35 and is supported therein. A sleeve 36 having a spherical outer surface serves as the support member. At 37 is shown an anti-torsion safety device.

At the drive side end (FIG. 2) the core 30 is supported via a pin-like extension 30b and via a self-aligning roller bearing 38 at the bearing neck 22 of the rotating roll shell 20. The two roller bearings 38 and 24 have a common center point. However, this is not absolutely necessary. For example, the extension pin 30b could be shorter so that the bearing 38 is disposed in the region of the flange 22a of the bearing neck 22. This would have the advantage that instead of the self-aligning roller bearing 24 shown a similar bearing having a smaller diameter could be used. As is known, the self-aligning roller bearings 23 and 24 allow inclination of the roll within given limits. This can occur throughout with the tilting of the roll in rocking levers. The core 30 can follow such an inclination without any difficulty due to the spherical outer surface of the sleeve 36 and the construction of the bearing 38 as a self-aligning bearing and due to the annular seals 32 which being able to be displaced radially in relation to the core 30.

The drive side end of the roll can also be constructed in a manner which varies from FIG. 2. For example, the roll shell can be driven via an eccentrically disposed drive shaft and via gears. Or the roll does not have any drive mechanism at all. In both cases the core, designed as a variation of FIG. 2, can be supported at its drive side end similarly to or exactly as at the operative side end. In other words: The core 30 is directly fixed to the outside of the support stand 26; or, as in FIG. 1, a connection head is also provided at the drive side end to support the beam therein.

As noted the space 31 is divided by the annular seals 32 into a plurality of annular chambers 31a, 31b . . . 31n. For example, when the roll shell 20 is approximately 7 meters long twenty-five annular seals 32 can be uniformly distributed over the length of the roll to form twenty-four annular chambers are formed. In certain circumstances it is expedient to divide the space 31 even more finely. For example, if the roll is used in a paper machine, then the distance from center to center of two adjacent annular seals 32 can be made equal to the distance between two adjacent adjustable spindles of the head box of the paper machine.

Figures 5, 6, 7, 8, 8A, 9, 10:
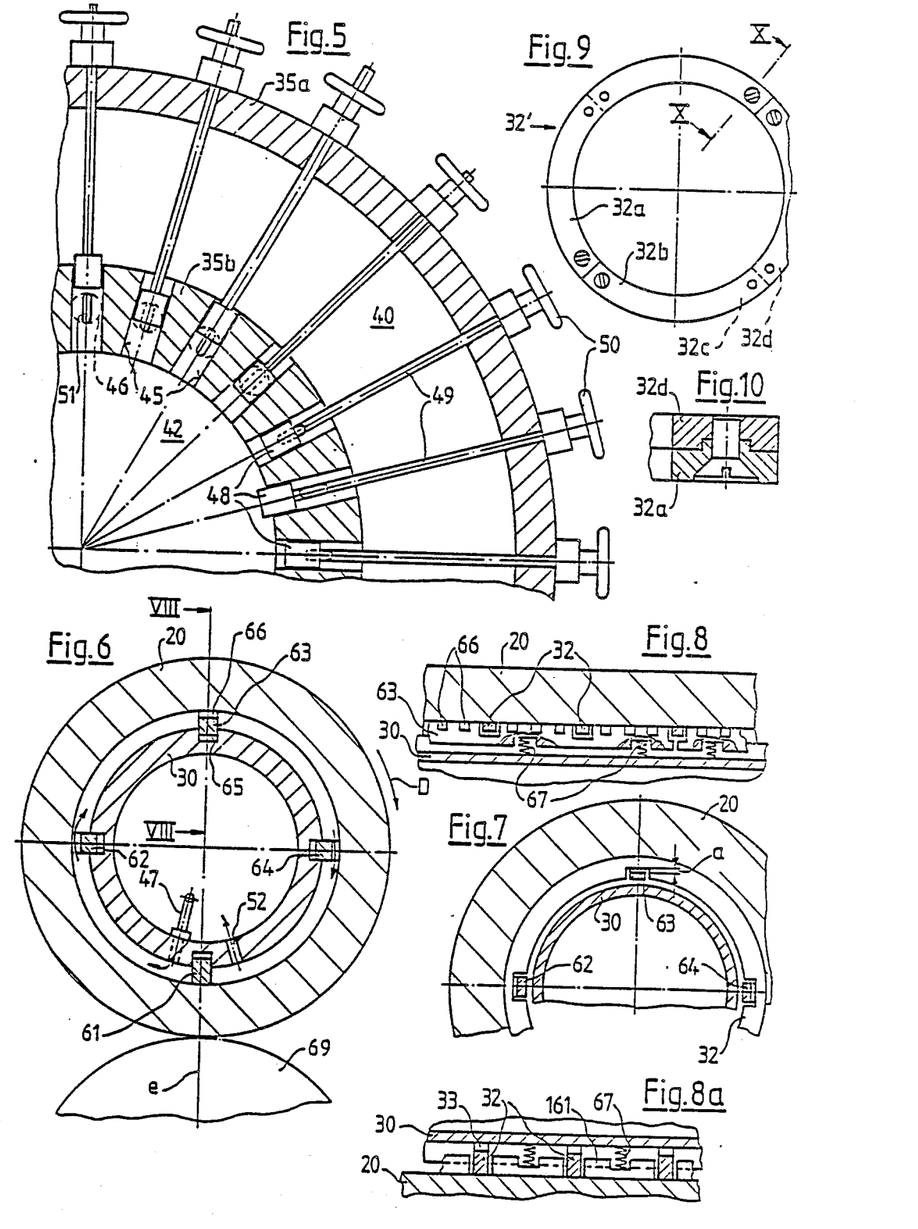
FIG. 5 is a partial cross section along line V—V of FIG. 1.
FIG. 6 is a cross section along line VI—VI of FIG. 1.
FIG. 7 is a partial cross section along line VII—VII of FIG. 1.
FIG. 8a shows a different partial longitudinal section along line VIII—VIII of FIG. 6.
FIG. 8 shows a partial longitudinal section along line VIII—VIII of FIG. 6.
FIG. 9 is a view of a composite annular seal.
FIG. 10 shows a cross section along line X—X of FIG. 9 on an enlarged scale.

In the first example which produces 24 circular chambers, twenty-four control valves (48, 50) are provided in the connection head 35, as can be seen in FIGS. 1 and 5, and these are expediently arranged in a star shape. The connection head 35 is preferably constructed of two housing parts 35a and 35b and includes an external, annular intake room 40 to which fluid with a preferably low temperature is supplied via a pipe 41. Moreover there is an intake room 42 lying within to which fluid with a preferably relatively high temperature can be supplied via a pipe 43. In general it suffices if the temperatures between the two fluids sources differ by 20° to 30° C. The two intake rooms 40 and 42 are separated from one another by an annular partition 44. Through this partition 44 extend several radial bores 45. The number of these bores corresponds to the number of annular chambers 31a to 31n. At the central region of each radial bore 45 is connected a substantially paraxial bore 46 which is connected to the respective annular chamber via a branch line, and in the case of FIG. 1 via a flexible hose 47. In each radial bore 45 is provided a piston-like valve body 48 which can be displaced in the bore 45 by means of a spindle 49 and a hand wheel 50 so that the branch line 47 is connected either to the external intake room 40 or to the internal intake room 42. FIG. 5 shows several different positions of the valve bodies.

Moreover it is evident that each of the radial bores 45 is connected to the subsequent paraxial bore 46 via a slot-shaped aperture 51. The slot 51 extends in the radial direction. Thereby, the flow rate of fluid can be finely altered during the displacement of the piston 48. From FIG. 5 it can be seen that each of the bores 46 can, if necessary, be sealed off from the two intake rooms 40 and 42. Instead of hand wheels 50 remotely-controlled motors (e.g. electromotors or compressed-air engines 59 or operating cylinders) can be used. Rotary pistons can also be used in place of the displaceable pistons 48.

Each annular chamber 31a, 31b . . . 31n is connected to the internal cavity 53 of the core 30 by a return bore 52. Bore 52 is in fluid communication with hollow extension tube 30a and outlet room 54 which is part of the connection head 35. From there the used fluid travels back via an emptying line 55 to a fluid preparation plant (not shown). In a variation on FIG. 1, in the core 30/30a, approximately right of above the roll axis, can be disposed mounting strips for the hoses 47, which extend transversally through the interior 53 of the core. Thereby the hoses 47 run outside the fluid flowing back through the interior 53. To achieve this goal the following can additionally be provided. In the lower region of flange 30b which connects the core parts 30 and 30a a bore 30c can be provided and in exactly the same way a bore 35c in the front wall of the connection head part 35a. Then the fluid can flow out of the cavity 53 via bore 30c, L the space 21a (between bearing neck 21 and extension tube 30a) and the bore 35c into the intake room 54.

Because of the possibility that the core 30 can be tilted relative to the connection head 35, the branch lines 47 consist of elastic hoses, noted. This and also the division of connection head 35 into a housing shell 35a and a valve housing part 35b, which can be inserted on the front side, (to which the already mentioned partition belongs), the assembly of the roll is facilitated. For this the procedure is expediently as follows: the hoses 47 are at first connected only at the interior of the core 30 (if necessary with the aid of hand apertures which are subsequently shut). After inserting the core 30 in the roll shell 20, 21, 22 and after mounting the bearing 23, the support stand 25 and the housing shell 35a, the hoses 47 outside the housing shell 35a are connected to the valve housing part 35b. Thereafter valve housing part 35b is fixed to the housing shell 35a. Finally the valve parts 48, 49 and 50 are installed.

Figure 3:
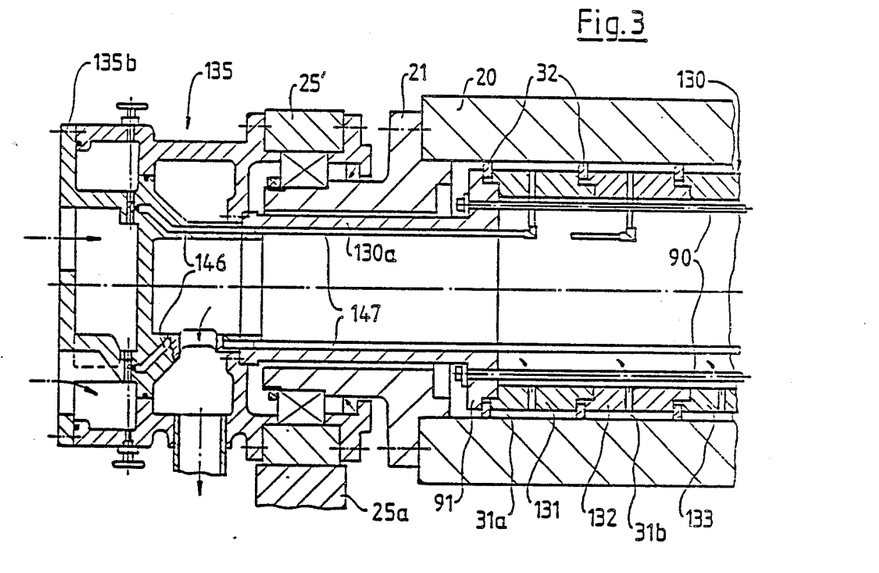
FIG. 3 shows a variant embodiment of the device of FIG. 1.

FIG. 3 is an exemplified embodiment of a roll rigidly supported in a machine frame 25a. Note that inclination of the roll shell 20 and that of the core 130 should not happen. Consequently the core 130 having extension tube 130a can be rigidly connected to the connection head 135 which in turn is mounted to the support stands 25′. The branch lines 147 can now be fastened in the core 130. They extend up to the outer end of the extension tube 130a. The valve housing 135b extends in this case up to the previously mentioned extension tube 130a and has a corresponding number of channels 146 to which the branch lines 147 are connected. Furthermore there are many common parts in the embodiments of FIGS. 1, 2 and 4, so that the majority of roll components can be used for both embodiments.

However FIG. 3 shows a further possible variant to the core 130. In contrast to FIGS. 1 and 2, the core 130 is comprised of several annular bodies 131, 132, 133 . . . . The annular bodies have centering devices which fit into one another and so designed that at each joint between two annular bodies is formed an annular groove for an annular seal 32. Consequently the axial length of each annular chamber 31a, 31b . . . 31n (and the distance between two annular seals) is determined by the length of the respective annular body. Each of the annular seals is inserted into its groove before two annular bodies are joined. Consequently single-part closed sealing rings can be used. Several tension rods 90 are provided which connect the annular bodies with each other and with the flange 91 of the extension tube 130a (and with an invisible extension pin on the other roll end). Of course a core which is slantingly supported in accordance with FIGS. 1 and 2 (e.g. by means of spherical sleeve 36 and pivot bearing 38) can also be composed of several annular bodies.

FIGS. 6 to 10 show further details of the roll. Each annular seal 32 (FIG. 7) or 32' (FIG. 9) is preferably manufactured from a metallic material. Its circular cylindrical outer surface 60 (FIG. 7) has a diameter which is insignificantly smaller (i.e. by approx. 2/10 to 4/10 mm) than the internal diameter of the roll shell 20. To prevent torsion of the sealing ring 32 a longitudinal bar 61 or (in accordance with FIGS. 6 to 8) several longitudinal bars 61 to 64 can be used which extend parallel to the roll axis and rest in corresponding longitudinal grooves 65 on the exterior of the core 30.

The longitudinal bars 61 to 64 have other functions as explained below. For example, in accordance with FIG. 6 four longitudinal bars are distributed uniformly over the periphery of core 30. One of the bars is constructed as a sealing strip 61, i.e. it has a full cross section. The fluid supply line 47 to the respective zone is (unlike FIG. 1) disposed on one side of the longitudinal sealing strip 61 and the return bore 52 is disposed on the other side. Consequently the fluid is forced to flow almost around almost the entire periphery of the beam 30, as is shown by arrows in FIG. 6. The rotational direction of the roll shell 20 (arrow D) is preferably in the same direction as the fluid flow direction. The other bars 62, 63 and 64 are constructed as scraper bars, i.e. they are intended to scrape the fluid film adhering to the roll shell and which tends to insulate it. However they must have adequately proportioned apertures for fluid, to pass there through either in the form of recesses 66 (see FIGS. 6 and 8) or in the form of bores. Instead of or in addition to these apertures channels can be incorporated in the core 30 which go around the bars 62 to 64.

The longitudinal bars 61, 62, 63 and 64 are displaceable relative to the core 30 in the radial direction. However, in contrast to the annular seals 32, they are pressed with the aid of pressure springs 67 with slight force onto the inner surface of the roll shell 20. The longitudinal bars 61 to 64 can be divided in accordance with FIG. 8a into individual parts 161, each of which extends from one annular seal 32 to the next, i.e. through an annular chamber. However, in accordance with FIG. 8, they can also extend across several annular chambers. If they are to serve as protection against torsion for the annular seals 32, then in the region of each annular seal 32 they have a recess, that is at its side turned towards the roll shell 20. The annular seal 32 can be inserted into this recess, the said seal for this purpose having a corresponding recess at its side turned towards the core 30 on each peripheral seal. From FIGS. 7 and 8 it is evident that the recesses in the longitudinal bars and in the annular seals are dimensioned so that there is a radial 2 mm between the longitudinal bars 61 to 64 on the one hand and each of the annular seals 32.

In FIG. 6 is shown a portion of a counter roll 69. This roll cooperates with the roll of the invention, which roll comprises a solely deflection-controllable roll as has been previously described. The two rolls together form a press nip which lies in the press plane e. For the reasons given previously, the longitudinal sealing strip 61 is disposed in or at least near to the plane e. The counter roll 69 can be constructed as a conventional deflection-controllable roll.

If the core of FIG. 3 is composed of a plurality of annular bodies 131, 132, 133 . . . , the annular seals 32 can be made from a single piece, as already mentioned. Otherwise the annular seals preferably may be comprised of several pieces as in FIGS. 9 and 10. Accordingly an annular seal 32' is composed of four semi-circular segments 32a, 32b, 32c and 32d, which overlap one another in the peripheral direction and are centered against one another (FIG. 10). Each ring 32' is not fully assembled until after the insertion of the segments in one of the annular grooves of the beam, e.g. by means of screws. Despite being comprised of several parts, the ring 32' is closed and therefore substantially more resistant against deformation during heating than an open ring (as is normal in the case of piston rings), which is inserted into the annular groove by the spreading thereof.

Figure 11:
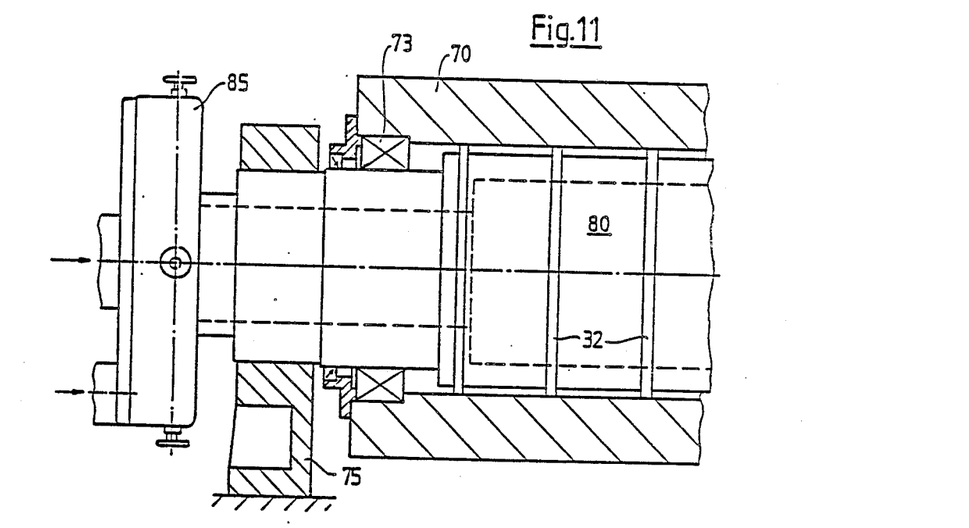
FIGS. 11 and 12 show partial longitudinal sections through a further embodiment of the present invention.
Figure 12:
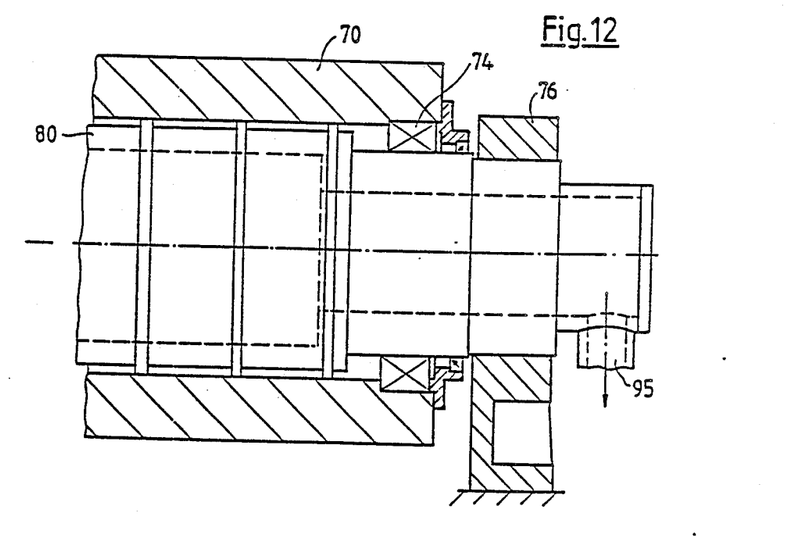

FIGS. 11 and 12 show a roll which differs in the following details from the embodiments of FIGS. 1 to 4. The core 80 is directly supported in the support stands 75 and 76. The roll shell 70 has no bearing necks, but is supported directly on the core 80 by means of the roller bearings 73 and 74. The roll shell 70 has no drive (which is also possible with the examples of FIGS. 1, 3 and 4). At both ends of the core 80 can be disposed fluid supply and discharge devices. In the example shown an intake head 85 is fixed at the operative side end (FIG. 11) of the core 80.

At the drive side end (FIG. 12) a discharge line 95 is connected to the core.

Figure 4:
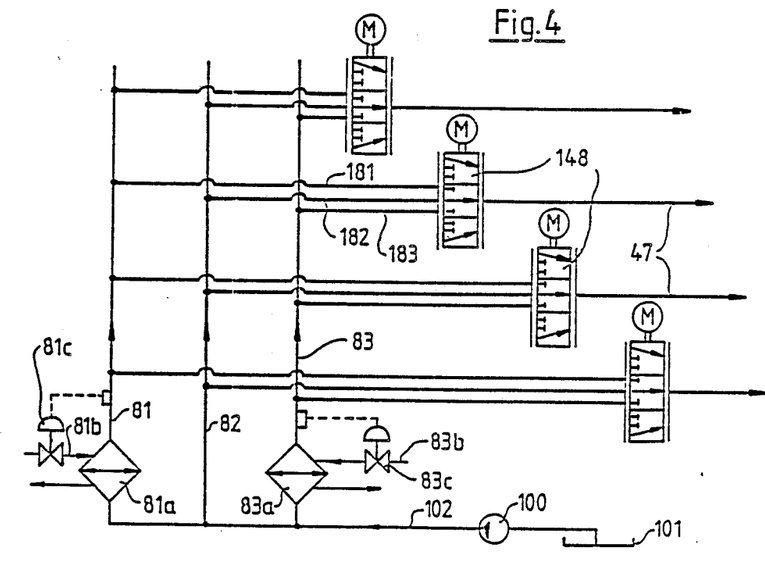
FIG. 4 shows a pipe diagram for feeding fluid to the roll.

In contrast to previously described embodiments, three intakes 81, 82 and 83 are provided for three fluid flows in accordance with FIG. 4, instead of only two intakes 40/41 and 42/43 (FIG. 1) for two fluid flows (transporting varying quantities of heat). Again each annular chamber 31a, 31b . . . 31n can be selectively connected to one of three intakes 81, 82 or 83. For simplification, only four of a plurality of control valves 148 which belong to a roll are shown in FIG. 4.

As in FIG. 1, the outlet of each control valve 148 is connected to the associated annular chamber (not visible in FIG. 4) via a supply line 47. Each control valve is connected via three inlet channels 181, 182 and 183 to the intakes (main intake lines) 81, 82, 83 and can be brought out of the central position shown into two final positions and any intermediate positions by means of a motor M. A pump 100 supplies fluid from a storage container 101 to a line 102, from which the three intakes 81, 82 and 83 branch off. The intakes 81 and 83 each lead through a heat exchanger 81a and 83a. To one heat exchanger 81a steam can be supplied via the line 81b, on the other hand to the other (83a) cooling water can be supplied via the line 83b. Consequently the fluid temperature in the intake 81 is higher and in the intake 83 is lower than in the intake 82. The magnitude of the temperature difference can be adjusted by a steam or cooling water control valve 81c or 83c respectively. Return lines 52, 55 (FIG. 1) are not shown in FIG. 4.

We claim:

1. A roll arrangement comprising at least two press rolls which rotate against each other to form a press nip, one of the two rolls being solely a deflection-controllable roll and the other press roll being solely a zone by zone temperature-controllable roll whereby the rolls are controlled independently of one another and the temperature-controllable roll includes a rotatable tubular roll shell and a stationary core extending through the roll shell, the tubular roll shell and the stationary core each having respective first and second axial ends, means for supporting the first and second axial ends of both the roll shell and the core, a plurality of annular chambers which follow one another along the rotational axis of the roll, the annular chambers being located in an annular clearance provided between the core and the roll shell, and a means for flowing fluid through each annular chamber to control the temperature of each respective section of the roll shell which lies adjacent each annular chamber.

2. A roll arrangement comprising at least two press rolls which rotate against each other to form a press nip, one of the two rolls being of a deflection-controllable design and the other press roll being constituted of a zone by zone temperature-controllable roll;

the temperature-controllable press roll including:
 a tubular roll shell rotatable about an axial axis and having an interior surface, means for supporting the shell at the axial ends thereof, and a means for rotating the shell;
 a stationary core extending through the shell and having an exterior surface which faces the interior surface of the shell and means for supporting the core at its axial ends, the exterior diameter of the core being smaller than the interior diameter of the shell to define an annular space therebetween, which annular space has a radial thickness which changes in response to variations in the relative positions of the shell and the core arising from external forces applied to the shell;
 at least one peripheral seal, in the shape of a closed ring, located on and extending circumferentially around the core, the at least one seal dividing the annular space between the shell and the core into a plurality of annular chambers, the at least one seal having a contacting surface in sliding contact with the interior surface of the shell, the sliding contact making a non-pressure tight seal with the interior surface of the shell thereby to reduce frictional heat and wear normally occurring at the contacting surface of the peripheral seal;
 means for enabling the at least one seal to move into the surface of at least one of the shell and the core to accommodate variations in the radial thickness of the annular space whereby forces exerted on the seal by the shell or by the core will not be applied by the seal, respectively, to the core or to the shell; and
 a respective fluid supply line and a respective fluid return line coupled to each of the annular chambers for, respectively, supplying to and withdrawing from the annular chambers a temperature regulating fluid at about atmospheric pressure, whereby a local external diameter of the roll is controlled by regulating the temperature of the fluid in each annular chamber.

3. The roll of claim 2, in which the at least one seal comprises a plurality of such seals axially spaced from one another, the enabling means comprising a respective groove in the surface of at least one of the shell and the core for each one of the seals.

4. The roll of claim 3, in which the seals are in sealing contact with the interior surface of the shell, the respective groove is provided in the core, and the seals are comprised of a stiff material.

5. The roll of claim 3, further comprising a respective single longitudinal seal extending in parallel to the axis of the shell in each of the annular chambers, and wherein the respective supply line to each chamber is located adjacent the longitudinal seal on one side thereof and the return line is disposed adjacent the longitudinal seal and on the other side thereof, in a manner that the fluid must flow for about 360° around the core to flow from the supply line to the return line.

6. The roll according to claim 3, wherein the longitudinal seal abuts the roll shell and is movable radially relative to the core.

7. A roll according to claim 6, further comprising a scraper bar which extends generally in the same direction as the longitudinal seal, the scraper bar being radially displaceable relative to the core and having fluid channels formed therein for permitting the temperature regulating fluid to flow from the supply line to the return line.

8. A roll according to claim 7, wherein the length of the longitudinal seal and the scraper bar is not greater than the distance between adjacent peripheral seals.

9. A roll according to claim 6, wherein the core is comprised of a plurality of annular body portions which follow one another along the axis of the core, the length of each annular body portion being about the distance between adjacent peripheral seals, and an annular groove located at the joint of adjacent annular body portions for receiving one of the peripheral seals, each peripheral seal having a unitary body construction.

10. A roll according to claim 6, further including a respective control valve coupled to the respective supply line of each annular chamber, and a first source of fluid of a first given temperature and a second source of fluid of a second different temperature, the respective control valve coupling the sources of fluids to the supply line and being controllable to connect the supply line to a selected one of the sources of fluids.

11. A roll according to claim 10, further comprising a third source of fluid of a third temperature, the control valve being coupled additionally to the third source of fluid and adapted to selectively connect the third fluid source to its respective supply line.

12. A roll according to claim 11, in which the fluid associated with the first fluid source has a mean temperature, the fluid associated with the second fluid source has a temperature which is higher that the mean temperature, and the fluid in the third source is of temperature which lies below the mean temperature.

13. A roll according to claim 12, wherein the control valve includes means for mixing the fluids from the first, second and third sources based on the position of an actuator associated with the control valve.

14. A roll arrangement comprising at least two press rolls which rotate against each other to form a press nip, one of the two rolls being of a deflection-controllable design and the other press roll being constituted of a zone by zone temperature-controllable roll;

the temperature-controllable press roll including:
 a tubular roll shell rotatable about an axial axis and having an interior surface, means for supporting the shell at the axial ends thereof, and a means for rotating the shell;
 a stationary core extending through the shell and having an exterior surface which faces the interior surface of the shell and means for supporting the core at its axial ends, the exterior diameter of the core being smaller than the interior diameter of the shell to define an annular space therebetween, which annular space has a radial thickness which changes in response to variations in the relative positions of the shell and the core arising from external forces applied to the shell;

at least one peripheral seal, in the shape of a closed ring, located on and extending circumferentially around the core, the at least one seal dividing the annular space between the shell and the core into a plurality of annular chambers, the at least one seal having a contacting surface in sliding contact with the interior surface of the shell, the sliding contact making a non-pressure tight seal with the interior surface of the shell therby to reduce frictional heat and wear normally occurring at the contacting surface of the peripheral seal; and fluid supply means for circulating a temperature regulating fluid which is supplied at about atmospheric pressure through the annular chambers, whereby a local external diameter of the roll is controlled by regulating the temperature of the fluid in each annular chamber.

15. The roll of claim 14, in which the at least one seal comprises a plurality of such seals axially spaced from one another.

16. A roll according to claim 15, wherein the fluid supply means comprises a respective fluid supply line and a respective fluid return line coupled to each of the annular chambers for, respectively, supplying to and withdrawing from the annular chambers, the temperature regulating fluid.

17. A roll according to claim 16, further comprising a longitudinal seal extending parallel to the axis of the shell and a scraper bar which extends generally in the same direction as the longitudinal seal, the scraper bar having fluid channels formed therein for permitting the temperature regulating fluid to flow from the supply line to the return line.

18. A roll in accordance with claim 15, in which each peripheral seal comprises a plurality of joint seal sections, each one of the seal sections being ring-shaped, the seal sections being arranged to follow one another along the axis of the roll shell.

* * * * *